Nov. 7, 1972      H. MAENZ ET AL      3,702,216
PHOTOGRAPHIC LENS OF HIGH IMAGE-RESOLVING POWER
COMPRISING TWO DOUBLETS AND FOUR
SINGLE LENS ELEMENTS
Filed Jan. 29, 1971

INVENTORS

United States Patent Office 3,702,216
Patented Nov. 7, 1972

3,702,216
PHOTOGRAPHIC LENS OF HIGH IMAGE-RESOLVING POWER COMPRISING TWO DOUBLETS AND FOUR SINGLE LENS ELEMENTS

Harald Maenz, Jena, and Gerhard Risch, Weimar, Germany, assignors to Jenoptik Jena G.m.b.H., Jena, District of Gera, Germany
Filed Jan. 29, 1971, Ser. No. 109,266
Int. Cl. G02b 9/62
U.S. Cl. 350—215    3 Claims

ABSTRACT OF THE DISCLOSURE

A photographic lens of high-image resolving power comprises two doublets and four single lens elements. It defines a field angle of $2\delta=10°$ with an aperture of 0.36, and a field angle of $2\delta=14°$ with an aperture of 0.25. The image errors are highly corrected, and the wave aberration lies within the Rayleigh limits. The lens members, from object side to image side, are arranged under definite conditions as follows: a positive doublet, an aperture diaphragm, a positive meniscus, a biconcave element, a biconvex element, a positive doublet, and a biconcave element.

---

Figure 1:
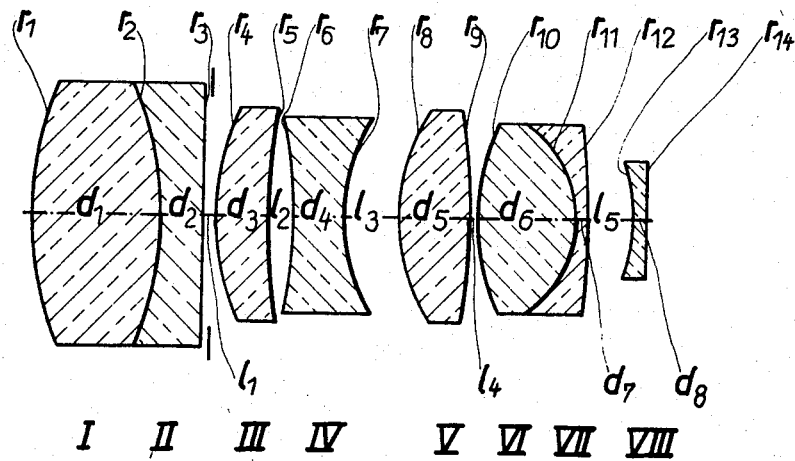

This invention relates to a photographic lens of high image-resolving power of the kind comprising two doublets and four single lens elements, which defines a field angle of $2\delta=10°$ with an aperture of 0.36 and a field angle of $2\delta=14°$ with an aperture of 0.25. For the sake of clarity, the doubles are hereinafter designated I/II and VI/VII; and the single elements, III, IV, V and VIII, counting from front to rear, i.e. from object side to image side. The aperture diaphragm lies between the positive doublet I/II and the positive single element III. The doublet I/II is biconvex, its cemented face being concave towards the object. The element III is a positive meniscus having its concave face in the rear. The elements IV and VIII are biconcave and include the element V and the doublet VI/VII the cemented face of which is concave towards the object. The element V and the doublet VI/VII are biconvex.

The known lenses of the foregoing kind, of large aperture and comparatively large field angle, have an image-resolving power which lies far below the theoretical possibility of $$\frac{\sin \alpha}{0.61\lambda}$$

wherein $\alpha$ is the angle of aperture and $\lambda$ is the wavelength used. However, modern technology, for example in making miniature electronic circuits or in the microrecording of documents, is bound to rely on lenses that actually ensure the said theoretical image-resolution. The prior art lenses for this particular purpose are either corrected for an aperture smaller than 0.25 or have a useful field angle that lies below $2\delta=8°$.

The present invention aims at providing a photographic lens of the foregoing kind by means of which the theoretically possible image-resolving power is obtained with an aperture of 0.36 and a field angle of $2\delta=10°$ or with an aperture of 0.25 and a field angle of $2\delta=14°$. Moreover, the qualities of very good correction of the geometric-optical image errors, such as aperture error, image-field curvature, astigmatism, sagittal and meridional coma, distortion, longitudinal and transverse chromatical aberration, are to be accompanied by a wave aberration that lies within the Rayleigh limits. A criterion of the residual errors of wave aberration is the definition brillancy, which must be above 80 percent.

To this end, the present invention consists in a photographic lens of high image-resolving power which comprises, from object side to image side, a doublet I/II, single lens elements III, IV, V, a doublet VI/VII, and a single lens element VIII, the doublet I/II and the element III being positive and including an aperture diaphragm; and in which the element I is biconvex, the cemented face being concave towards the object, and the element III is a meniscus having its concave face in the rear; and in which the elements IV and VIII are biconcave and include the element V and the doublet VI/VII, the element V and the doublet VI/VII being biconvex, and the cemented face in VI/VII being concave towards the object; wherein the sum of the radii of those faces of the elements IV and V which bound the intermediate air space is greater than 1.2f and smaller than $$1.5f(1.2f \leq r_7+r_8 \leq 1.5f)$$

$f$ being the focal length of the entire lens; the difference of the refractive indices $n$ of the cemented elements VII and VI, referring to a wavelength $\lambda=546.1$ nm., is greater than 0.08 and smaller than $$0.12(0.08 \leq n_{VII}-n_{VI} \leq 0.12)$$

the difference of the Abbe numbers of the cemented elements VI and VII lies between 20 and $$26(20 \leq \nu_{eVI}-\nu_{eVII} \leq 26)$$

the refractive power of VIII is greater than $-1.65\varphi_L$ and smaller than $-1.45\varphi_L(-1.65\varphi_L \leq \varphi_{VIII} \leq -1.45\varphi_L)$, $\varphi_L$ being the refractive power of the entire lens; the sum of the refractive powers of VI and VII lies between $0.5\varphi_L$ and $0.7\varphi_L(0.5\varphi_L \leq \varphi_{VI}+\varphi_{VII} \leq 0.7\varphi_L)$; and the sum of the thicknesses of the lens elements I and II is greater than 0.5f and smaller than $$0.65f(0.5f=t_1+t_2=0.65f)$$

Figure 2:
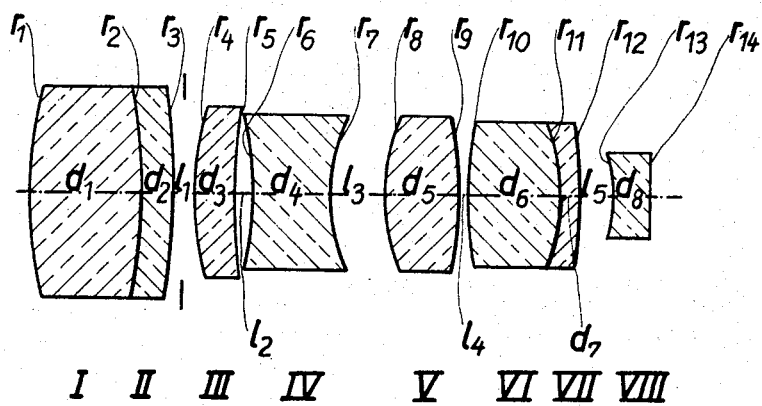

The following Tables 1 and 2 and the FIGS. 1 and 2 of the accompanying drawing illustrate two embodiments of the lens according to the invention, the scale of the drawing being 50:1.

The lens of Table 1 and FIG. 1 is corrected for an aperture 0.36, an image angle $2\delta=10°$ and an image scale $\beta^1=-0.10$. The lens of Table 2 and FIG. 2 is corrected for an aperture 0.25, an image angle $2\delta=14°$ and an image scale $\beta^1=-0.167$. The focal length of both lenses is 1.

TABLE 1

| Radii | Thickness(t) or distance(s) | $n_e$ | $\nu_e$ |
|---|---|---|---|
| $r_1=1.3834$ | | | |
| | $t_1=0.4581$ | 1.62522 | 56.4 |
| $r_2=-1.1078$ | | | |
| | $t_2=0.1451$ | .70451 | 40.7 |
| $r_3=-28.4096$ | | | |
| | $s_1=0.0458$ | (Diaphragm space) | |
| $r_4=0.9002$ | | | |
| | $t_3=0.1714$ | 1.68080 | 54.8 |
| $r_5=2.8161$ | | | |
| | $s_2=0.0874$ | | |
| $r_6=-2.2702$ | | | |
| | $t_4=0.1947$ | 1.66038 | 33.2 |
| $r_7=0.6219$ | | | |
| | $s_3=0.2107$ | | |
| $r_8=0.6595$ | | | |
| | $t_5=0.2600$ | 1.68080 | 54.8 |
| $r_9=-2.3493$ | | | |
| | $s_4=0.0038$ | | |
| $r_{10}=0.9437$ | | | |
| | $t_6=0.3329$ | 1.59156 | 52.9 |
| $r_{11}=-0.4205$ | | | |
| | $t_7=0.0763$ | 1.69398 | 30.9 |
| $r_{12}=-2.9303$ | | | |
| | $s_5=0.1519$ | | |
| $r_{13}=-0.4541$ | | | |
| | $t_8=0.0359$ | 1.67278 | 46.7 |
| $r_{14}=19.0911$ | | | |

TABLE 2

| Radii | Thickness (t) or distance(s) | $n_e$ | $v_e$ |
|---|---|---|---|
| $r_1=1.2180$ | | | |
| | $t_1=0.4201$ | 1.68111 | 55.2 |
| $r_2=-3.0334$ | | | |
| | $t_2=0.1188$ | 1.70458 | 29.8 |
| $r_3=-54.6607$ | | | |
| | $s_1=0.0663$ | (Diaphragm space) | |
| $r_4=0.9681$ | | | |
| | $t_3=0.1285$ | 1.68102 | 55.2 |
| $r_5=3.1137$ | | | |
| | $s_2=0.0636$ | | |
| $r_6=-1.9550$ | | | |
| | $t_4=0.2764$ | 1.70458 | 29.8 |
| $r_7=0.6851$ | | | |
| | $s_3=0.1713$ | | |
| $r_8=0.7507$ | | | |
| | $t_5=0.2957$ | 1.68111 | 55.2 |
| $r_9=-1.9667$ | | | |
| | $s_4=0.0028$ | | |
| $r_{10}=1.0339$ | | | |
| | $t_6=0.3565$ | 1.57018 | 55.7 |
| $r_{11}=-0.7585$ | | | |
| | $t_7=0.0633$ | 1.67765 | 32.0 |
| $r_{12}=-3.1969$ | | | |
| | $s_5=0.1244$ | | |
| $r_{13}=-0.5042$ | | | |
| | $t_8=0.1219$ | 1.68102 | 55.2 |
| $r_{14}=3.4147$ | | | |

We claim:

1. A photographic lens of high image resolving power which comprises, from object side to image side, a doublet I/II, single lens elements III, IV, V, a doublet VI/VII, and a single lens element VIII, the doublet I/II and the element III being positive and including an aperture diaphragm; and in which the element I is biconvex, the cemented face being concave towards the object, and the element III is a meniscus having its concave face in the rear; and in which the elements IV and VIII are biconcave, and the element V and the doublet VI/VII are biconvex, the cemented face in VI/VII being concave towards the object; wherein the sum of the radii of those faces of the elements IV and V which bound the intermediate air space is greater than $1.2f$ and smaller than $1.5f$ ($1.2f \leq r_7+r_8 \leq 1.5f$), $f$ being the focal length of the entire lens, the difference of the refractive indices $n$ of the cemented elements VII and VI, referring to a wavelength $\lambda=546.1$ nm., is greater than 0.08 and smaller than 0.12 ($0.08 \leq n_{VII}-n_{VI} \leq 0.12$); the difference of the Abbe numbers of the cemented elements VI and VII lies between 20 and 26 ($20 \leq v_{eVI}-v_{eVII} \leq 26$); the refractive power of VIII is greater than $-1.65\varphi_L$ and smaller than $-1.45\varphi_L$ ($-1.65\varphi_L \leq \varphi_{VIII} \leq -1.45\varphi_L$), $\varphi_L$ being the refractive power of the entire lens; the sum of the refractive powers of VI and VII lies between $0.5\varphi_L$ and $0.7\varphi_L$ ($0.5\varphi_L \leq \varphi_{VI}+\varphi_{VII} \leq 0.7\varphi_L$); and the sum of the thicknesses of the lens elements I and II is greater than $0.5f$ and smaller than $0.65f$ ($0.5f \leq t_1+t_2 \leq 0.65f$).

2. A lens as claimed in claim 1, characterized by the following features:

TABLE 1

| Radii | Thickness (t) or distance(s) | $n_e$ | $v_e$ |
|---|---|---|---|
| $r_1=1.3834$ | | | |
| | $t_1=0.4581$ | 1.62522 | 56.4 |
| $r_2=-1.1078$ | | | |
| | $t_2=0.1451$ | 1.70451 | 40.7 |
| $r_3=-28.4096$ | | | |
| | $s_1=0.0458$ | (Diaphragm space) | |
| $r_4=0.9002$ | | | |
| | $t_3=0.1714$ | 1.68080 | 54.8 |
| $r_5=2.8161$ | | | |
| | $s_2=0.0874$ | | |
| $r_6=-2.2702$ | | | |
| | $t_4=0.1947$ | 1.66038 | 33.2 |
| $r_7=0.6219$ | | | |
| | $s_3=0.2107$ | | |
| $r_8=0.6595$ | | | |
| | $t_5=0.2600$ | 1.68080 | 54.8 |
| $r_9=-2.3493$ | | | |
| | $s_4=0.0038$ | | |
| $r_{10}=0.9437$ | | | |
| | $t_6=0.3329$ | 1.59156 | 52.9 |
| $r_{11}=-0.4205$ | | | |
| | $t_7=0.0763$ | 1.69398 | 30.9 |
| $r_{12}=-2.9303$ | | | |
| | $s_5=0.1519$ | | |
| $r_{13}=-0.4541$ | | | |
| | $t_8=0.0359$ | 1.67278 | 46.7 |
| $r_{14}=19.0911$ | | | | wherein $r$ stands for radius, $t$ for thickness, $s$ for distance, $n_e$ for refractive power, and $v_e$ for Abbe number.

3. A lens as claimed in claim 1, characterized by the following features:

TABLE 2

| Radii | Thickness (t) or distance(s) | $n_e$ | $v_e$ |
|---|---|---|---|
| $r_1=1.2180$ | | | |
| | $t_1=0.4201$ | 1.68111 | 55.2 |
| $r_2=-3.0334$ | | | |
| | $t_2=0.1188$ | 1.70458 | 29.8 |
| $r_3=-54.6607$ | | | |
| | $s_1=0.0663$ | (Diaphragm space) | |
| $r_4=0.9681$ | | | |
| | $t_3=0.1285$ | 1.68102 | 55.2 |
| $r_5=3.1137$ | | | |
| | $s_2=0.0636$ | | |
| $r_6=-1.9550$ | | | |
| | $t_4=0.2764$ | 1.70458 | 29.8 |
| $r_7=0.6851$ | | | |
| | $s_3=0.1713$ | | |
| $r_8=0.7507$ | | | |
| | $t_5=0.2957$ | 1.68111 | 55.2 |
| $r_9=-1.9667$ | | | |
| | $s_4=0.0028$ | | |
| $r_{10}=1.0339$ | | | |
| | $t_6=0.3565$ | 1.57018 | 55.7 |
| $r_{11}=-0.7585$ | | | |
| | $t_7=0.0633$ | 1.67765 | 32.0 |
| $r_{12}=-3.1969$ | | | |
| | $s_5=0.1244$ | | |
| $r_{13}=-0.5042$ | | | |
| | $t_8=0.1219$ | 1.68102 | 55.2 |
| $r_{14}=3.4147$ | | | | wherein $r$ stands for radius, $t$ for thickness, $s$ for distance, $n_e$ for refractive power, and $v_e$ for Abbe number.

References Cited
UNITED STATES PATENTS

| | | | |
|---|---|---|---|
| 2,989,895 | 6/1961 | Sandback | 350—215 |
| 3,395,962 | 8/1968 | Herzberger et al. | 350—215 |
| 3,602,578 | 9/1971 | Tibbetts et al. | 350—215 |

JOHN K. CORBIN, Primary Examiner